(No Model.)

B. G. LUTHER.
CARRIER CHAIN FOR FEEDING BOARDS TO WOODWORKING MACHINES.

No. 522,223. Patented July 3, 1894.

Witnesses.
Charles Hannigan.
H. J. Garceau.

Inventor.
Benjamin G. Luther
by L. Scholfield
Atty.

UNITED STATES PATENT OFFICE.

BENJAMIN G. LUTHER, OF WORCESTER, MASSACHUSETTS.

CARRIER-CHAIN FOR FEEDING BOARDS TO WOODWORKING-MACHINES.

SPECIFICATION forming part of Letters Patent No. 522,223, dated July 3, 1894.

Application filed June 15, 1893. Serial No. 477,726. (No model.)

*To all whom it may concern:*

Be it known that I, BENJAMIN G. LUTHER, a citizen of the United States, residing at Worcester, in the State of Massachusetts, have invented a new and useful Improvement in Carrier-Chains for Feeding Boards to Woodworking-Machines, of which the following is a specification.

My invention consists in the improved construction and arrangement of the engaging dog of the carrier-chain link, as hereinafter fully set forth.

Figure 1:
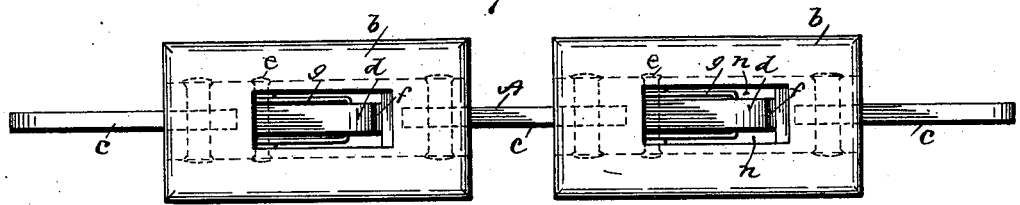
Figure 2:
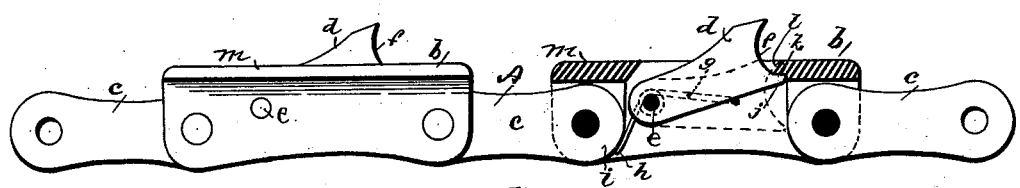
Figure 3:
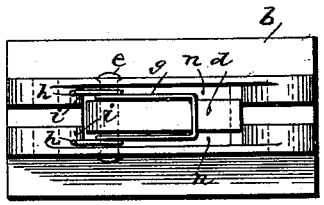

In the accompanying drawings:—Figure 1, represents the top view of a portion of my improved chain. Fig. 2, represents a side elevation of one of the engaging links of the chain, and a longitudinal section of the adjacent engaging link. Fig. 3, represents an under view of the engaging link of the chain.

In the accompanying drawings, A represents a chain such as is employed for feeding boards to the saws or cutters of woodworking machinery, the engaging links $b, b$, being connected to each other by means of the intervening link $c$; and in carrying out my improvement, I employ a dog $d$, provided with the recessed end $f$, and arranged to swing upon the pivot $e$, the said dog being held in its raised engaging position, by means of the spring $g$, the said spring being preferably constructed of wire coiled around the pivot $e$ at each side of the dog $d$, and crossing under the said dog, the ends $h$ of the wire bearing against the ears $i, i$, of the link, as shown in Figs. 2 and 3; the resilience of the said spring serving to hold the engaging dog in its raised position, as shown in the drawings, the depressed position of the dog being shown by dotted lines in Fig. 2. The raised position of the dog is limited by the engagement of the lip $j$, with the shoulder $k$ of the link $b$; and the downward position of the same is limited by the inclined shoulder $l$, as shown by the dotted lines.

When the board is placed upon the chain, the several dogs $d$ which lie under the board, will be pressed downward against the resilience of the spring $g$, to the level of the upper surface $m$ of the links $b$, and the edge of the board will engage with the succeeding raised dog of the chain, and will be carried forward thereby to engagement with the saws or cutters of the machine.

The construction of my improved carrier link is such, that sufficient space $n$, is left at each side of the dog $d$, and at the end of the said dog in the recess $f$, to provide for the proper clearance of saw dust or other material liable to prevent the proper elevation of the dog upon the removal of the board therefrom, and this is an important feature of my invention.

I claim as my invention—

In a carrier-chain, the combination with the carrier-link provided with the shoulder $k$, of the pivoted engaging dog $d$, provided with the recess $f$, and with the lip $j$ adapted to engage with the shoulder $k$, and the spring $g$ arranged substantially as described.

BENJAMIN G. LUTHER.

Witnesses:
SOCRATES SCHOLFIELD,
FRANK. W. BOWER.